Feb. 15, 1938.  E. W. WEBB  2,108,220
SIDE BEARING FOR CAR TRUCKS
Filed Oct. 7, 1937
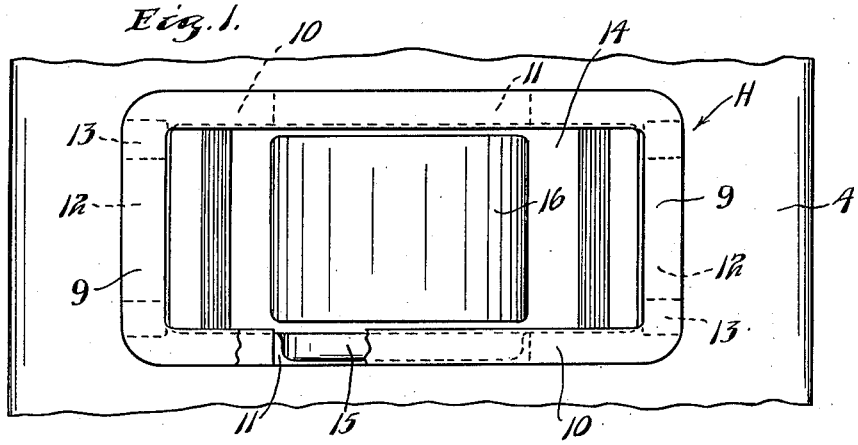
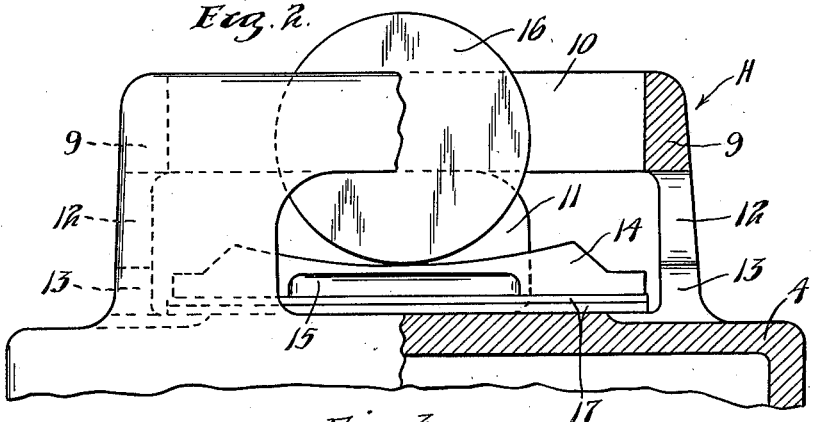
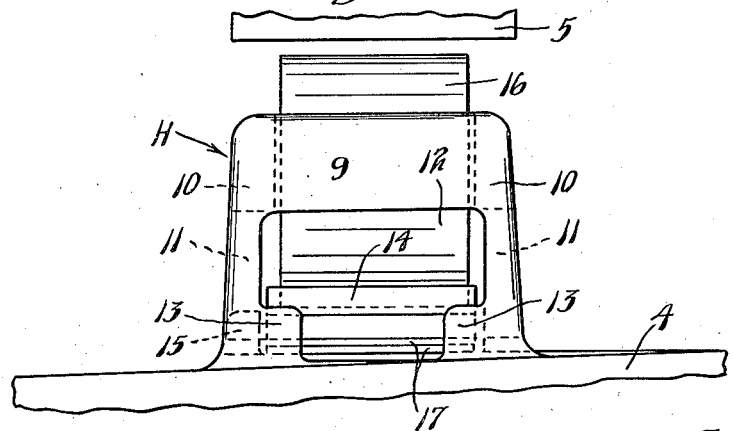
INVENTOR.
EDWIN W. WEBB.
BY HIS ATTORNEYS.
Williamson & Williamson Patented Feb. 15, 1938

2,108,220

UNITED STATES PATENT OFFICE 2,108,220

SIDE BEARING FOR CAR TRUCKS

Edwin W. Webb, Chicago, Ill., assignor to Standard Car Truck Company, Chicago, Ill., a corporation of New Jersey Application October 7, 1937, Serial No. 167,748

4 Claims. (Cl. 308—226)

This invention relates to side bearings for car trucks.

It is the general object of this invention to provide a novel and improved side bearing for car trucks including a housing, tread plate and bearing member and means for readily adjusting the height of the tread plate and bearing member in the housing without removal of these parts from the housing.

The objects and advantages of the invention will more fully appear from the following description made in connection with the accompanying drawing, wherein like reference characters refer to the same or similar parts throughout the various views, and, in which, Fig. 1 is a plan view of a portion of a truck bolster equipped with a side bearing embodying the invention;

Fig. 2 is a view partly in elevation and partly in vertical section of the parts shown in Fig. 1, the view being taken looking toward one side of the side bearing, and Fig. 3 is a view in elevation looking toward one end of the side bearing, part of the body bolster being shown.

Referring to the drawing, portions of a truck bolster 4 are shown forming part of a car truck, while in Fig. 3 portions of the side bearing surface of a body bolster 5 are shown.

Formed integral with the top surface of the truck bolster 4 and projecting upwardly therefrom is an open topped side bearing housing H having end walls 9 and side walls 10. The side walls 10 are equipped with central openings 11 in their lower portions. At least one of the end walls 9 and preferably both of them as shown, are provided with openings 12 therein. These openings 12 have upper portions spaced above the bottom of the housing of a length approximating the full width between the side walls 10. The openings 12 project downwardly to the bottom of the housing but the lower portions of the openings are considerably shorter in length than the upper portions thereof to form lower inturned wings or lugs 13 produced by the end walls below the upper portions of the openings and joining the side walls 10.

Fitting within the housing 8 is a roller tread plate 14 having a concave upper surface and having a tongue 15 projecting from one side thereof, this tongue being of such a size as to be received within one of the side openings 11. The tread plate 14 may be inserted within the housing 8 from the open top thereof by tilting the tread plate about a longitudinal axis thereof until the tongue 15 is fitted into one of the side openings 11, whereupon the tread plate can be straightened up to lie in the lower part of the housing. Working on the tread plate 14 is a roller 16 also received within the housing H.

To adjust the height of the tread plate 14 and roller 16 relative to the side bearing surface of the body bolster 5, one or more shims 17 may be employed. These shims may be inserted beneath the tread plate 14 and withdrawn therefrom through one of the end openings 12 without dismantling any part of the truck, or without disturbing either the truck bolster 4 or the body bolster 5. The shims 17 are of a size to readily fit within the lower part of the housing 8 below the tread plate 14 and the width of these shims is such as to permit the shims to be readily passed through the upper portion of an end opening 12, but the spacing between opposite lugs 13 is such as to prevent passage of the shims through the lower portion of an opening 12. To insert a shim in place as, for example, from the right end of the housing 8 the roller 16 is run down toward the left end of the housing, a hand is inserted through the right end opening 12 and the roller tread plate 14 is tilted upwardly at its right end. The shim 17 is then passed through the upper part of the right hand opening 12 below the tread plate to a position underlying the tread plate, whereupon the parts are allowed to drop to their normal position.

When a shim or shims 17 are in position, the lugs 13 take the end thrust of the shims 17 when the roller bearing is in service. If a tread plate 14 is employed which does not include a tongue 15 the lugs 13 will also take the end thrust imposed upon the tread plate.

It will be seen that an extremely simple and efficient side bearing has been provided by reason of the fact that the housing 8 of the side bearing is cast integral with the truck bolster 4 and yet adjustment of the height of the roller 6 and tread plate 14 can be made without disassembling any parts. An exceedingly cheap construction is provided which requires no labor in applying the side bearing to the truck bolster. While the shim insertion openings 12 are provided in the end walls 9 of the side bearing housing in the embodiment illustrated, it will be appreciated that analogous openings could be provided in the side walls 10, if this were desired.

It will be understood that various changes may be made in the form, details, arrangement and proportions of the various parts without departure from the scope of the present invention, which generally stated, consists in the matter shown and described and set forth in the appended claims.

What is claimed is:—

1. In a car truck, a side bearing comprising an open topped housing, a tread plate received therein and a bearing member received within said housing and working on said tread plate, said housing having four walls, one of said walls having an opening therein provided with its widest portion spaced above the bottom of the housing, the widest portion of said opening being of such size as to receive tread plate shims therethrough whereby shims may be inserted into and withdrawn from said housing through said opening, the opening equipped wall below the portion of the opening through which the shims may be received forming a stop preventing horizontal movement of inserted shims toward the opening equipped wall.

2. In a car truck, a truck bolster, an open topped side bearing housing cast integral with said bolster, and projecting upwardly therefrom, a tread plate received therein and a roller received therein, said roller working on said tread plate, said housing having four walls, one of said walls having an opening therein provided with its widest portion spaced above the bottom of the housing, the widest portion of said opening being of such size as to receive tread plate shims therethrough whereby shims may be inserted into and withdrawn from said housing through said opening, the opening equipped wall below the portion of the opening through which the shims may be received forming a stop preventing horizontal movement of inserted shims toward the opening equipped wall.

3. A side bearing for car trucks comprising an open topped housing, said housing having ends and sides, one of said ends having an opening therein extending to the bottom of the housing from a height spaced some little distance above the bottom of the housing, a roller tread plate received within the housing, a roller disposed within said housing and working on said tread plate and shims receivable beneath the tread plate, said opening being of slightly greater width than said shims in the upper portion thereof and said opening being of somewhat less width than the width of said shims in the lower portion thereof whereby end thrust imposed upon said shims may be taken by both ends of the housing and the shims may be inserted and withdrawn through the opening in said open end of the housing by running the roller down towards the opposite end of the housing and tilting the tread plate upwardly.

4. In a car truck, a truck bolster, an open topped side bearing housing cast integral with said bolster, said housing having sides and ends and one of said ends having an opening therein, the upper part of which opening extends in both directions throughout somewhat greater width than the lower part of the opening to provide inturned lugs defining the sides of the lower part of the opening, a roller tread plate received within said housing and a roller disposed within the housing and working on said tread plate, said device being so arranged that shims of slightly less width than the upper part of said end opening may be inserted through said end opening below said tread plate by tilting the roller and tread plate slightly and said lugs will take end thrust of said shims when said shims are in place.

EDWIN W. WEBB.